(12) United States Patent
Matsunaga et al.

(10) Patent No.: US 11,407,056 B2
(45) Date of Patent: Aug. 9, 2022

(54) PIERCE METAL FOR JOINING DIFFERENT MATERIALS AND METHOD OF JOINING DIFFERENT MATERIALS USING PIERCE METAL

(71) Applicant: SUBARU CORPORATION, Tokyo (JP)

(72) Inventors: Tatsunori Matsunaga, Tokyo (JP); Takashi Iizuka, Tokyo (JP); Seigo Shimizu, Tokyo (JP); Kunpei Ito, Tokyo (JP); Yugo Tomita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 147 days.

(21) Appl. No.: 16/837,321

(22) Filed: Apr. 1, 2020

(65) Prior Publication Data
US 2020/0361022 A1    Nov. 19, 2020

(30) Foreign Application Priority Data

May 16, 2019    (JP) .............................. JP2019-093026

(51) Int. Cl.
  *B23K 11/11*    (2006.01)
  *B23K 103/20*    (2006.01)
(52) U.S. Cl.
  CPC ......... *B23K 11/115* (2013.01); *B23K 2103/20* (2018.08)
(58) Field of Classification Search
  CPC .............. B23K 11/0066; B23K 11/115; B23K 2103/20
  USPC .......................................................... 219/91.2
  See application file for complete search history.

(56) References Cited

U.S. PATENT DOCUMENTS

2016/0123362 A1* 5/2016 Iwase ..................... F16B 5/08
                                                411/82

FOREIGN PATENT DOCUMENTS

CN           105689874    *  6/2016
JP           5722479 B2      5/2015

* cited by examiner

*Primary Examiner* — Dana Ross
*Assistant Examiner* — Joseph W Iskra
(74) *Attorney, Agent, or Firm* — McGinn IP Law Group, PLLC (57) ABSTRACT

A pierce metal includes a head and a shaft. The shaft is configured to penetrate through an aluminum die-cast member with a protruded tip surface of the shaft being exposed from the aluminum die-cast member, and an outer peripheral surface of the shaft is configured to come into contact with a through-hole of the aluminum die-cast member, upon joining the aluminum die-cast member and the iron-based member together. The head and the iron-based member in contact with the protruded tip surface are configured to be held under pressure and applied with electric power by weld electrodes to perform spot welding of the protruded tip surface and the iron-based member, upon joining the aluminum die-cast member and the iron-based member together. The outer peripheral surface includes a non-contact part configured to come into non-contact with the through-hole in a state in which the shaft is penetrated through the aluminum die-cast member.

20 Claims, 3 Drawing Sheets

PIERCE METAL FOR JOINING DIFFERENT MATERIALS AND METHOD OF JOINING DIFFERENT MATERIALS USING PIERCE METAL

CROSS-REFERENCE TO RELATED APPLICATIONS

The present application claims priority from Japanese Patent Application No. 2019-093026 filed on May 16, 2019, the entire contents of which are hereby incorporated by reference.

BACKGROUND

The technology relates to a pierce metal for joining different materials and a method of joining the different materials using the pierce metal. In particular, the technology relates to a pierce metal used for joining different materials including an aluminum die-cast member and an iron-based member, and a method of joining the different materials using the pierce metal.

Spot welding for joining aluminum alloy members together upon manufacturing a vehicle body is being established. However, spot welding for joining different materials, including an aluminum alloy member and an iron-based member such as a steel plate, is still under development, especially the spot welding of such materials for a mass production. For example, to join the aluminum alloy member and the iron-based member together, a pierce metal for joining different materials (hereinafter may be simply referred to as a "pierce metal") disclosed in Japanese Patent No. 5722479 can be used. Such a method joins the aluminum alloy member and the iron-based member together by driving the pierce metal into the aluminum alloy member to fix them together and performing spot welding of the pierce metal and the iron-based member. The pierce metal includes a head and a shaft protruded from the head. The head and the shaft are formed integrally by an iron-based material. Causing the shaft to penetrate the aluminum alloy member from a tip surface of the protrusion of the shaft allows the pierce metal to be swaged and thus fixed to the aluminum alloy member owing to a swaging part provided on the head. This also allows an outer peripheral surface of the shaft to come into contact with the aluminum alloy member. Thereafter, the iron-based member is brought into contact with the penetrating tip surface of the shaft, following which the iron-based member and the head of the pierce metal are held under pressure by a pair of weld electrodes and are applied with electric power by the weld electrodes. Thus, the tip of the shaft is spot-welded to the iron-based member, allowing the aluminum alloy member and the iron-based member to be joined together.

SUMMARY

An aspect of the technology provides a pierce metal for joining different materials including an aluminum die-cast member and an iron-based member. The pierce metal includes a head and a shaft. The shaft is provided integrally with the head and protrudes from the head, and includes an outer peripheral surface and a protruded tip surface. The shaft is configured to penetrate through the aluminum die-cast member with the protruded tip surface being exposed from the aluminum die-cast member, and the outer peripheral surface is configured to come into contact with a through-hole of the aluminum die-cast member, upon joining the aluminum die-cast member and the iron-based member together. The head and the iron-based member which is in contact with the protruded tip surface are configured to be held under pressure by a pair of weld electrodes and are configured to be applied with electric power by the pair of weld electrodes to perform spot welding of the protruded tip surface and the iron-based member, upon joining the aluminum die-cast member and the iron-based member together. The outer peripheral surface includes a non-contact part configured to come into non-contact with the through-hole in a state in which the shaft is penetrated through the aluminum die-cast member.

An aspect of the technology provides a pierce metal for joining different materials including an aluminum die-cast member and an iron-based member. The pierce metal includes a head, a shaft, and a hollow part. The shaft is provided integrally with the head and protrudes from the head, and includes an outer peripheral surface and a protruded tip surface. The hollow part extends from the head to the shaft, excluding the protruded tip surface. The shaft is configured to penetrate through the aluminum die-cast member with the protruded tip surface being exposed from the aluminum die-cast member, and the outer peripheral surface is configured to come into contact with a through-hole of the aluminum die-cast member, upon joining the aluminum die-cast member and the iron-based member together. The head and the iron-based member which is in contact with the protruded tip surface are configured to be held under pressure by a pair of weld electrodes and are configured to be applied with electric power by the pair of weld electrodes to perform spot welding of the protruded tip surface and the iron-based member, upon joining the aluminum die-cast member and the iron-based member together.

An aspect of the technology provides a method of joining different materials including an aluminum die-cast member and an iron-based member. The method includes preparing a pierce metal for joining the different materials. The pierce metal includes a head and a shaft that is provided integrally with the head and protrudes from the head, and the shaft includes an outer peripheral surface and a protruded tip surface. The method includes driving the pierce metal into the aluminum die-cast member to cause the shaft to penetrate through the aluminum die-cast member with the protruded tip surface being exposed from the aluminum die-cast member in such a manner that the outer peripheral surface comes into contact with a through-hole of the aluminum die-cast member, and the outer peripheral surface includes a non-contact part that comes into non-contact with the through-hole in a state in which the shaft is penetrated through the aluminum die-cast member. The method includes spot welding the protruded tip surface and the iron-based member, through holding the head and the iron-based member which is in contact with the protruded tip surface under pressure by a pair of weld electrodes and applying electric power to the head and the iron-based member by the pair of weld electrodes.

An aspect of the technology provides a method of joining different materials including an aluminum die-cast member and an iron-based member. The method includes preparing a pierce metal for joining the different materials. The pierce metal includes a head, a shaft that is provided integrally with the head and protrudes from the head, and includes an outer peripheral surface and a protruded tip surface, and a hollow part extending from the head to the shaft, excluding the protruded tip surface. The method includes driving the pierce metal into the aluminum die-cast member to cause the shaft to penetrate through the aluminum die-cast member with the protruded tip surface being exposed from the aluminum die-cast member in such a manner that the outer peripheral surface comes into contact with a through-hole of the aluminum die-cast member. The method includes spot welding the protruded tip surface and the iron-based member, through holding the head and the iron-based member which is in contact with the protruded tip surface under pressure by a pair of weld electrodes and applying electric power to the head and the iron-based member by the pair of weld electrodes.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 1A and 1B are cross-sectional views, before spot welding, of a pierce metal for joining different material according to one example embodiment of the technology, which is used for a method of joining the different materials according to one example embodiment of the technology, in which

DETAILED DESCRIPTION

When an aluminum alloy member, especially an aluminum die-cast member in which an aluminum alloy is casted, and an iron-based member are joined together by spot welding that uses a pierce metal for joining different materials (hereinafter may be simply referred to as a "pierce metal"), a crack or a break can occur on the aluminum die-cast member. The occurrence of the crack or the break is prominent in the vicinity of an edge of the aluminum die-cast member. Such an issue is presumably due to low ductility of the aluminum die-cast member. To address the issue, the aluminum die-cast member may be thermally treated to increase the ductility, prior to the joining of the aluminum die-cast member and the iron-based member by the pierce metal. In this case, however, an extra thermal treatment is required, which is not practical in terms of both workability and costs. What is therefore desired is a pierce metal that reduces or prevents the occurrence of the crack of the aluminum die-cast member even upon joining different materials including the aluminum die-cast member and the iron-based member by means of the spot welding, and a method of joining the different materials using the pierce metal.

In addition, spot welding in which electrodes are mounted on a manipulator such as an industrial robot has been widely performed upon spot-welding a panel member for a vehicle. However, the panel member to be subjected to such spot welding is large in size, which can cause misalignment, to some extent, of positions at which the respective electrodes come into contact with the panel member. If the electrode is misaligned from the middle of a head of the pierce metal, a branch current is generated in the aluminum die-cast member, which is higher in electric conductivity than the iron-based member configuring the pierce metal. The generation of the branch current can cause melting and its consequential scattering of the aluminum die-cast member or can lead to a decrease in nugget diameter, which in turn can result in insufficient joining of the pierce metal and the iron-based member. What is therefore desired is the pierce metal that helps to ensure the joining of the aluminum die-cast member and the iron-based member through the pierce metal even upon joining different materials including the aluminum die-cast member and the iron-based member by means of the spot welding, and a method of joining the different materials using the pierce metal.

It is desirable to provide a pierce metal for joining different materials that helps to ensure that an aluminum die-cast member and an iron-based member are joined together while reducing or preventing an occurrence of a crack of the aluminum die-cast member even upon joining different materials including the aluminum die-cast member and the iron-based member by means of spot welding, and a method of joining the different materials using the pierce metal.

In the following, a pierce metal for joining different materials and a method of joining the different materials using the pierce metal according to some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Figure 1A:
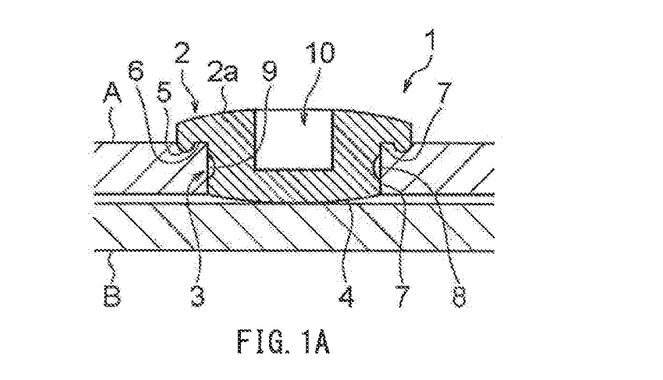
FIG. 1A is a cross-sectional view of the pierce metal having a recess.
Figure 1B:
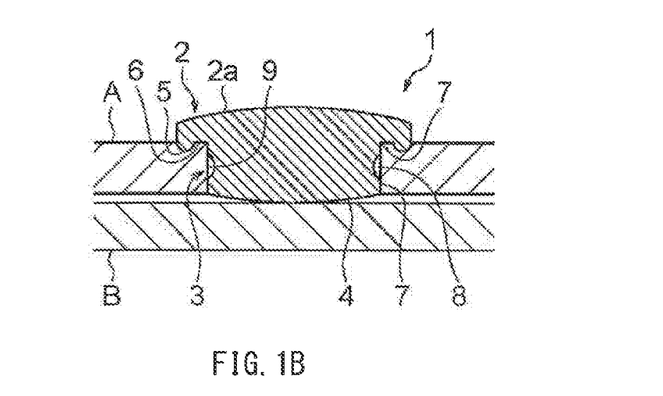
FIG. 1B is a cross-sectional view of the pierce metal without the recess.
Figure 7A:
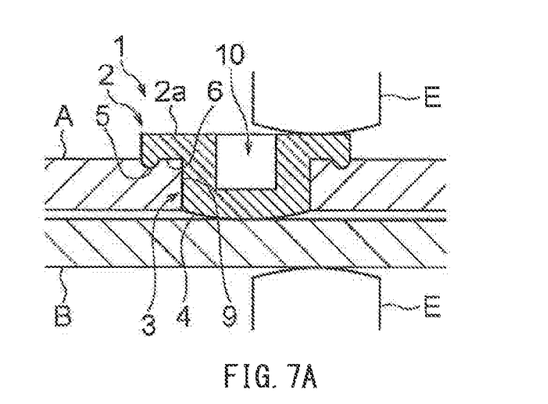
FIG. 7A is a schematic cross-sectional view of the pierce metal in which an electrode is misaligned in a horizontal direction in the drawing from the middle of a head of the pierce metal with which the electrode should come into contact.

FIGS. 1A and 1B are cross-sectional views, before spot welding, of a pierce metal for joining different materials (hereinafter may be simply referred to as a "pierce metal") 1 according to an example embodiment. FIGS. 1A and 1B illustrate a state in which a shaft 3 of the pierce metal 1 is penetrated through an aluminum die-cast plate A and an iron-based plate B is brought into contact with a penetrating tip surface 4 of the shaft 3. In one embodiment, the aluminum die-cast plate A may serve as an "aluminum die-cast member". In one embodiment, the iron-based plate B may serve as an "iron-based member". A difference between FIG. 1A and FIG. 1B is only whether a recess 10 to be described in greater detail is provided or not. In a later spot-welding process, a head 2 of the pierce metal 1 and the iron-based plate B are held under pressure by a pair of electrodes E and are applied with a spot-welding current between the electrodes E in the state in which the head 2 and the iron-based plate B are held under pressure by the electrodes E, as illustrated in FIG. 7A, for example. As a result, a nugget in which the protruded tip of the shaft 3 of the pierce metal 1 and the iron-based plate B are melted and thus solidified may be formed between the protruded tip of the shaft 3 and the iron-based plate B, allowing the shaft 3 of the pierce metal 1 and the iron-based plate B to be spot welded. Thus, the aluminum die-cast plate A and the iron-based plate B are joined together. In some embodiments, the shaft 3 of the pierce metal 1 may be driven into or riveted to the aluminum die-cast plate A by means of a pair of dies (e.g., a punch and a die), as disclosed in Japanese Patent No. 5722479, for example. When the shaft 3 of the pierce metal 1 is driven into the aluminum die-cast plate A, the shaft 3 may punch through the aluminum die-cast plate A, forming a through-hole 9 on the aluminum die-cast plate A.

The pierce metal 1 has the head 2 and the shaft 3 that are integrally formed with each other as disclosed in Japanese Patent No. 5722479, for example. In some embodiments, the head 2 and the shaft 3 may include the same iron-based material. The head 2 may have a substantially disk shape. The shaft 3 is protruded from the head 2, and may have a substantially cylindrical shape. The head 2 may have an outer diameter that is larger than an outer diameter of the shaft 3. The head 2 and the shaft 3 may be typically coaxial with respect to each other. The head 2 may have a top surface 2a, i.e., an upper surface in FIGS. 1A and 1B, that is disposed on the opposite side of the shaft 3. The top surface 2a may have a dome shape that protrudes spherically, in order to bring a location with which the electrode comes into contact upon the spot welding toward the middle. The head 2 may also have a surface that is positioned on the shaft 3 side, i.e., a lower surface in FIGS. 1A and 1B, and whose periphery serves as a swaging part 5. The swaging part 5 may be continuously protruded in a ring shape having a semicircular cross-section. The surface on the shaft 3 side of the head 2, i.e., the lower surface in FIGS. 1A and 1B, may also have a recessed groove 6 that is positioned on the inner peripheral side of the swaging part 5 and provided in a circular pattern. As described previously, the shaft 3 of the pierce metal 1 is driven into a member to be subjected to riveting, i.e., driven into the aluminum die-cast plate A in an example embodiment. When the shaft 3 of the pierce metal 1 is driven into the aluminum die-cast plate A, the swaging part 5 as a ring-shaped projection digs into the aluminum die-cast plate A, causing a material of the aluminum die-cast plate A positioned on the inner side of the swaging part 5 to plastically flow into the recessed groove 6 and thereby allowing the pierce metal 1 to be swaged and thus fixed to the aluminum die-cast plate A. In an example embodiment, a curvature radius of the semicircular cross-section of the swaging part 5 may be adjusted to prevent an occurrence of a crack on the aluminum die-cast plate A upon driving the swaging part 5 into the aluminum die-cast plate A.

In an example embodiment, the tip surface 4 of the shaft 3 may have a dome shape that protrudes spherically. As can be appreciated from FIG. 1A, FIG. 1B, and any other drawing, only the dome-shaped tip surface 4 may protrude from the aluminum die-cast plate A toward the iron-based plate B. The dimensions of the protrusion of the dome-shaped tip surface 4 from the aluminum die-cast plate A may be set in advance. For example, an angle between the dome-shaped tip surface 4 of the shaft 3 and an outer periphery of the shaft 3 influences shearing force generated when the shaft 3 punches through the aluminum die-cast plate A, and the angle varies depending on the curvature radius of a spherical surface of the tip surface 4 forming the dome shape. More specifically, the angle depends on an outer diameter of the shaft 3 as well. If the curvature radius of the dome-shaped spherical surface of the tip surface 4 is large, the shearing force generated when the shaft 3 punches through the aluminum die-cast plate A can decrease, whereas burr can occur around the through-hole 9 following the punching if the curvature radius of the dome-shaped spherical surface of the tip surface 4 is small. In an example embodiment, to achieve a balance between these trade-off factors, the curvature radius of the dome-shaped spherical surface of the tip surface 4 may be adjusted. In addition, as will be described later in greater detail, forming the tip surface 4 of the shaft 3 into the dome shape has an effect of causing a current density upon the spot welding to be concentrated at the center of the tip surface 4 of the shaft 3 and thereby helping to ensure that the nugget is formed between the center of the tip surface 4 of the shaft 3 and the iron-based plate B.

In an example embodiment, an outer peripheral surface of the shaft 3 of the pierce metal 1 has a contact part 7 and a non-contact part 8 that are provided in a predetermined region in a direction of the protrusion of the shaft 3. The contact part 7 may come into contact with an inner peripheral surface of the aluminum die-cast plate A in a state in which the shaft 3 of the pierce metal 1 is penetrated through or driven into the aluminum die-cast plate A. The non-contact part 8 may have a diameter smaller than a diameter of the contact part 7, and does not come into contact with the inner peripheral surface of the aluminum die-cast plate A in the state in which the shaft 3 of the pierce metal 1 is penetrated through or driven into the aluminum die-cast plate A. The cross-sectional area, perpendicular to an extending direction of the shaft 3, of the non-contact part 8 may be smaller than the cross-sectional area, perpendicular to the extending direction of the shaft 3, of the through-hole 9. In an example embodiment illustrated in FIGS. 1A and 1B, the shaft 3 may have a first cylindrical contact part 7, a second cylindrical contact part 7, and a recessed non-contact part 8. The first cylindrical contact part 7 may be provided on the head 2 side of the shaft 3, i.e., on the base end side of the shaft 3. The second cylindrical contact part 7 may be provided on the opposite side of the head 2 of the shaft 3, i.e., on the tip of the protrusion of the shaft 3. The first cylindrical contact part 7 and the second cylindrical contact part 7 each may have a diameter same as or substantially the same as a diameter of the through-hole 9 of the aluminum die-cast plate A. The recessed non-contact part 8 may be so recessed between the first cylindrical contact part 7 and the second cylindrical contact part 7 as to have an arc-shaped cross section. For example, providing, on the inner side in a radial direction of the swaging part 5, the first cylindrical contact part 7 that comes into contact with the through-hole 9 of the aluminum die-cast plate A helps to ensure the swaging force of the pierce metal 1 derived from the swaging part 5 and the first cylindrical contact part 7.

Figure 6:
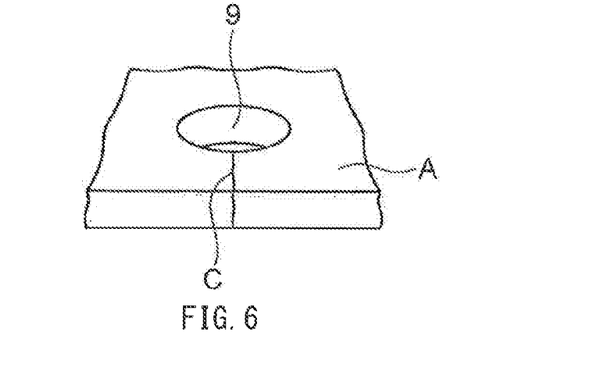
FIG. 6 is an explanatory diagram illustrating a crack generated on an aluminum die-cast member.

If the shaft 3 has the same outer diameter as a whole, i.e., is so-called waistless, and the outer peripheral surface of the shaft 3 as a whole comes into contact with the through-hole 9 of the aluminum die-cast plate A, large stress such as compressive stress acts on the aluminum die-cast plate A due to thermal expansion upon the spot welding. The aluminum die-cast plate (e.g., the aluminum die-cast member) A is low in ductility as compared with a non-casted aluminum alloy, which can lead to an occurrence of a crack after the spot welding, especially a crack C that occurs on an edge of any aluminum die-casted member after the spot welding as illustrated in FIG. 6, for example. In contrast, according to an example embodiment, the non-contact part 8 that does not come into contact with the through-hole 9 of the aluminum die-cast plate A is formed at a part of the shaft 3, e.g., in a predetermined region in the direction of the protrusion of the shaft 3. Thus, even under circumstances in which the thermal expansion is occurred upon the spot welding, the non-contact part 8 does not come into contact with the aluminum die-cast plate A, or less presses the aluminum die-cast plate A even if the non-contact part 8 comes into contact with the aluminum die-cast plate A. Accordingly, it is possible to allow the stress to be applied to the aluminum die-cast plate A to be zero (0) or to be small and thereby to prevent the occurrence of the crack C. In some embodiments, the non-contact part 8 may be provided around the entire outer periphery of the shaft 3. In some embodiments, the non-contact part 8 may be provided only around a part of the outer periphery of the shaft 3, which also makes it possible to achieve the effect of preventing the occurrence of the crack C.

The technology encompasses various modifications for configurations of the contact part 7 and the non-contact part 8.

Figure 2:
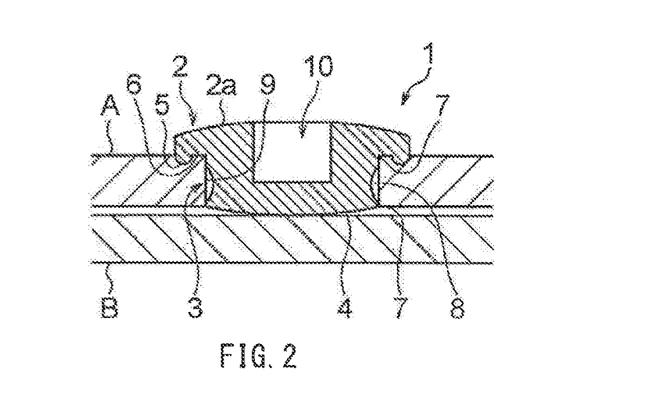
FIG. 2 is a cross-sectional view of the pierce metal illustrated in FIGS. 1A and 1B, according to a first modification example.

FIG. 2 illustrates a first modification example of the shaft 3 illustrated in FIGS. 1A and 1B. The shaft 3 according to the first modification example may have the cylindrical contact part 7, an outer peripheral contact part 7, and the recessed non-contact part 8. As with an example illustrated in FIGS. 1A and 1B, the cylindrical contact part 7 may be provided on the head 2 side of the shaft 3, i.e., on the base end side of the shaft 3, and may have a diameter same as or substantially the same as the diameter of the through-hole 9 of the aluminum die-cast plate A. The outer peripheral contact part 7 may correspond to an outer peripheral edge of the dome-shaped tip surface 4, and may have a diameter same as or substantially the same as the diameter of the through-hole 9 of the aluminum die-cast plate A. The recessed non-contact part 8 may be so recessed between the cylindrical contact part 7 and the outer peripheral contact part 7 as to have an arc-shaped cross section.

Figure 3:
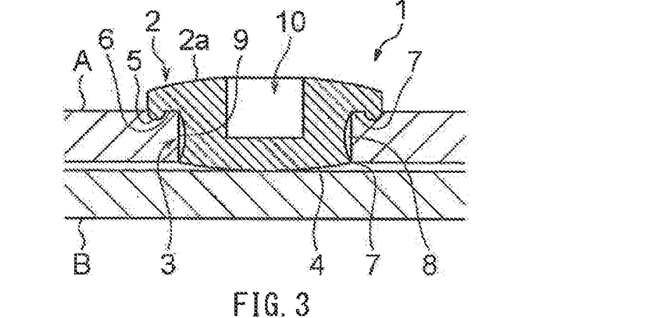
FIG. 3 is a cross-sectional view of the pierce metal illustrated in FIGS. 1A and 1B, according to a second modification example.

FIG. 3 illustrates a second modification example of the shaft 3 illustrated in FIGS. 1A and 1B. The shaft 3 according to the second modification example may have the outer peripheral contact part 7, an inner peripheral contact part 7, and the recessed non-contact part 8. As with an example illustrated in FIG. 2, the outer peripheral contact part 7 may correspond to the outer peripheral edge of the dome-shaped tip surface 4. The inner peripheral contact part 7 may correspond only to an inner peripheral edge of the recessed groove 6, and may have a diameter same as or substantially the same as the diameter of the through-hole 9 of the aluminum die-cast plate A. The recessed non-contact part 8 may be so recessed between the outer peripheral contact part 7 and the inner peripheral contact part 7 as to have an arc-shaped cross section.

Figure 4:
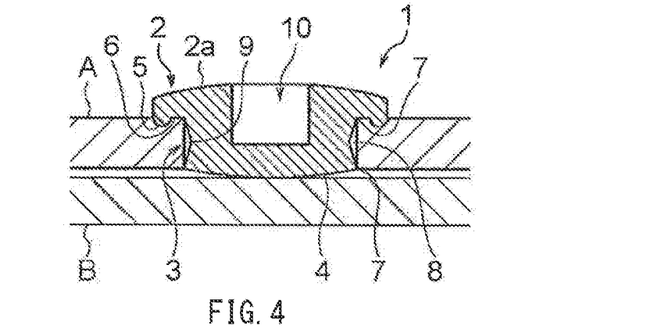
FIG. 4 is a cross-sectional view of the pierce metal illustrated in FIGS. 1A and 1B, according to a third modification example.

FIG. 4 illustrates a third modification example of the shaft 3 illustrated in FIGS. 1A and 1B. The shaft 3 according to the third modification example may have the outer peripheral contact part 7, the inner peripheral contact part 7, and a drum-shaped non-contact part 8. As with an example illustrated in FIG. 3, the outer peripheral contact part 7 may correspond to the outer peripheral edge of the dome-shaped tip surface 4. The inner peripheral contact part 7 may correspond only to the inner peripheral edge of the recessed groove 6. The drum-shaped non-contact part 8 may be so recessed between the outer peripheral contact part 7 and the inner peripheral contact part 7 as to have an L-shaped cross section.

Figure 5:
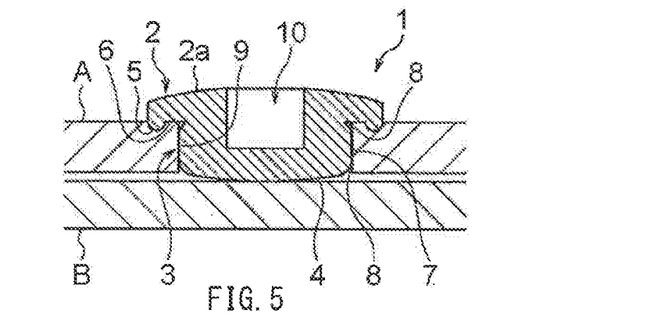
FIG. 5 is a cross-sectional view of the pierce metal illustrated in FIGS. 1A and 1B, according to a fourth modification example.

FIG. 5 illustrates a fourth modification example of the shaft 3 illustrated in FIGS. 1A and 1B. The shaft 3 according to the fourth modification example may have the cylindrical contact part 7 and a chamfered non-contact part 8. The cylindrical contact part 7 may have a diameter same as or substantially the same as the diameter of the through-hole 9 of the aluminum die-cast plate A, at the middle of the shaft 3 in the direction of the protrusion of the shaft 3. The chamfered non-contact part 8 may be so recessed as to have a chamfered shape at the tip and a base end of the shaft 3 in the direction of the protrusion of the shaft 3. Note that the shaft 3 according to the fourth modification example illustrated in FIG. 5 can involve difficulties in shearing, by means of the outer peripheral edge of the tip surface 4, the through-hole 9 having an inner diameter necessary for the aluminum die-cast plate A. Hence, optionally, the through-hole 9 may be formed in advance on the aluminum die-cast plate A, following which the shaft 3 of the pierce metal 1 may be penetrated through the through-hole 9 and may be fixed by swaging.

In some embodiments, except for an example embodiment illustrated in FIG. 1B, the pierce metal 1 may have a hollow shape from the middle of the head 2 to the center of the shaft 3, excluding the protruded tip surface 4 of the shaft 3, to form the recess 10. In one embodiment, the hollow shape may serve as a "hollow part". For example, the recess 10 forming the hollow shape may be a circular hole that is coaxial with the head 2 and the shaft 3. In an alternative example embodiment, the recess 10 may have a cross-sectional shape other than the cross-sectional shape that forms the circular hole.

The electrodes E directed to the spot welding may be mounted on a manipulator of a robot such as an industrial robot (hereinafter simply referred to as a "robot"). The robot typically operates along a taught track precisely; however, a panel member to be subjected to such spot welding is large in size, which can cause misalignment, to some extent, of positions at which the respective electrodes E come into contact with the panel member.

FIG. 7A is a schematic cross-sectional view of the pierce metal 1 in which the electrode E is misaligned in a horizontal direction in the drawing from the middle of the head 2 of the pierce metal 1 with which the electrode E should come into contact. To clarify the misalignment of the electrode E from the middle of the head 2, FIG. 7A illustrates an example in which the top surface 2a of the head 2 is flat instead of having the dome shape, and the shaft 3 is waistless. In a case where a position at which the electrode E comes into contact with the pierce metal 1 is misaligned from a position above the cross-section of the shaft 3 and is positioned above the aluminum die-cast plate A accordingly as illustrated in FIG. 7A, a branch current is generated in the aluminum die-cast plate A, which is higher in electric conductivity than an iron-based material configuring the pierce metal, if the head 2 and the shaft 3 are both solid. The generation of the branch current can cause melting and its consequential scattering of the aluminum die-cast plate A or can lead to a decrease in nugget diameter, which in turn can result in insufficient joining of the pierce metal 1 and the iron-based plate B.

Figure 7B:
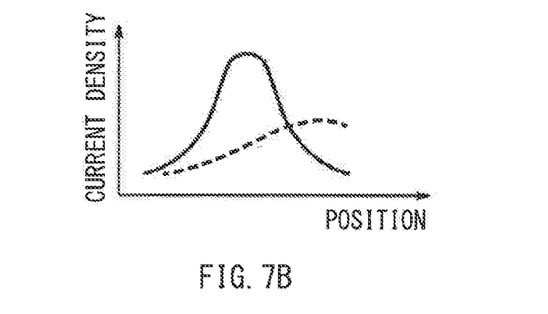
FIG. 7B is an explanatory diagram illustrating current densities upon application of electric power in the pierce metal illustrated in any of FIGS. 1A to 5.

FIG. 7B illustrates current densities upon the spot welding at the tip surface 4 of the shaft 3 of the pierce metal 1. The current densities illustrated in FIG. 7B correspond to the respective positions of the electrode E illustrated in FIG. 7A, in which a broken line denotes the current density at the tip surface 4 of the shaft 3 of the pierce metal 1 in which both the head 2 and the shaft 3 are solid. As can be appreciated from an example illustrated in FIG. 7B, it is possible to bring the current density upon the spot welding at the tip surface 4 of the shaft 3 toward the center of the tip surface 4 of the shaft 3 to some extent, owing to the dome-shaped protrusion of the tip surface 4 of the shaft 3. Nevertheless, the current density tends to become maximum at a position with which the electrode E is in contact. However, the head 2 and the shaft 3 both having the hollow shape allow the current density upon the spot welding at the tip surface 4 of the shaft 3 to be maximum at the center of the tip surface 4 of the shaft 3, as denoted by a solid line in FIG. 7B. In other words, forming the head 2 and the shaft 3 into the hollow shape allows the spot-welding current to be concentrated at the center of the tip surface 4 of the shaft 3 and thereby makes it possible to increase the nugget diameter while reducing or preventing the melting of the aluminum die-cast plate A. This helps to ensure that the pierce metal 1 and the iron-based plate B are joined together. In some embodiments, the recess 10 derived from the hollow shapes of the head 2 and the shaft 3 may have a shape in which a bottom of the recess 10 is located at a predetermined position. For example, the predetermined position may be where a distance from the bottom of the recess 10 to the tip surface 4 of the shaft 3 is half or less than the dimensions of the protrusion of the shaft 3. In addition, as will be described later in greater detail, forming the top surface 2a of the head 2 into the dome shape allows for further concentration of the current density upon the spot welding at the center of the tip surface 4 of the shaft 3.

It is to be noted that forming the head 2 and the shaft 3 into the hollow shape also helps to reduce the occurrence of the crack upon the spot welding. The hollow shape allows an amount of expansion toward the outer side in a radial direction resulting from a sensible heat to be smaller than that of the solid shape. Accordingly, it is possible to reduce, by an amount corresponding to the reduced amount of the expansion, the compressive stress that acts on the aluminum die-cast plate A due to the thermal expansion of the shaft 3 upon the spot welding, and thereby to reduce the occurrence of the crack.

Figure 8A:
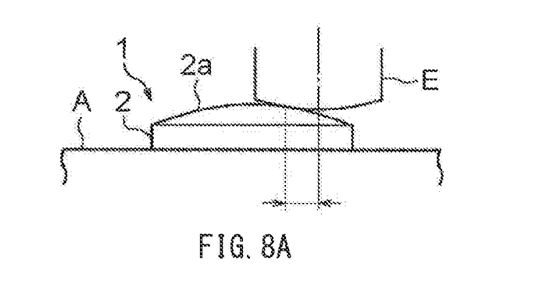
FIGS. 8A and 8B are each an explanatory diagram illustrating a spot weld electrode brought into contact with a head of the pierce metal illustrated in any of FIGS. 1A to 5.
Figure 8B:
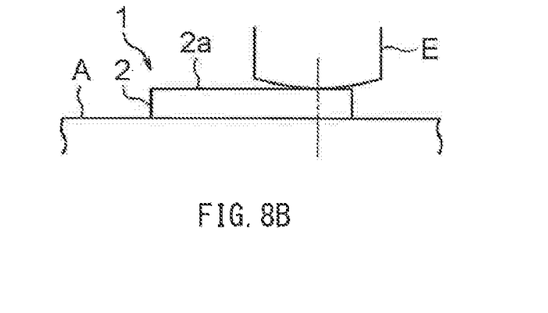

In some embodiments, as noted previously, the top surface 2a of the head 2 may also be so protruded as to have the dome shape. If the top surface 2a of the head 2 is flat as illustrated in FIG. 8B, it is difficult or not possible to bring, toward the middle of the head 2, the position with which the electrode E comes into contact to correct the misalignment, as with an example illustrated in FIG. 7A. However, forming the top surface 2a of the head 2 into the spherical dome shape allows the position with which the electrode E comes into contact to be brought toward the middle of the head 2 even in a case where the electrode E is positioned at the same position as a case where the top surface 2a of the head 2 is flat, as illustrated in FIG. 8A. Accordingly, by an amount corresponding to the amount in which the position is brought toward the middle of the head 2, it is possible to cause the current density illustrated in FIG. 7B to be concentrated at the center of the tip surface 4 of the shaft 3. It is to be noted here that, in some embodiments, the head 2 and the shaft 3 may be made solid, owing to the spherical dome-shaped top surface 2a of the head 2 that allows the current density upon the spot welding to be concentrated at the center of the tip surface 4 of the shaft 3.

The pierce metal or the method of joining the different materials using the pierce metal according to at least one embodiment of the technology includes the pierce metal 1 having the shaft 3 that includes the contact part 7 and the non-contact part 8. The contact part 7 may come into contact with the through-hole 9 of the aluminum die-cast plate A in a state in which the shaft 3 of the pierce metal 1 is penetrated through the aluminum die-cast plate A. The non-contact part 8 may have a diameter smaller than the diameter of the contact part 7, and does not come into contact with the through-hole 9 of the aluminum die-cast plate A in the state in which the shaft 3 of the pierce metal 1 is penetrated through the aluminum die-cast plate A. Thus, even under circumstances in which the shaft 3, having been penetrated through the aluminum die-cast plate A, has thermally expanded upon the spot welding, the stress to be applied to the aluminum die-cast plate A, such as the compressive stress, is zero (0) or is small in the non-contact part 8 that comes into non-contact with the aluminum die-cast plate A in the state in which the shaft 3 is penetrated through the aluminum die-cast plate A. Accordingly, it is possible to reduce or prevent the occurrence of the crack C even for the aluminum die-cast plate A whose ductility is low.

In some embodiments, the pierce metal 1 may have the hollow shape from the middle of the head 2 to the center of the shaft 3. Thus, even in a case where a position with which the electrode E comes into contact upon the spot welding is misaligned from the middle of the head 2, i.e., misaligned from the center of the shaft 3, a current that flows upon the spot welding flows in a concentrated fashion at the center of the shaft 3 in the protruded tip surface 4 of the shaft 3. This helps to ensure that the nugget is formed between the protruded tip of the shaft 3 and the iron-based plate B, and that the shaft 3 of the pierce metal 1 and the iron-based plate B are spot welded consequently. Accordingly, this in turn helps to ensure that the aluminum die-cast plate A and the iron-based plate B are joined together.

Although the pierce metal and the method of joining the different materials using the pierce metal according to some example embodiments of the technology have been described in the foregoing by way of example with reference to the accompanying drawings, the technology is by no means limited to the example embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the aluminum die-cast member and the iron-based member to be joined together by means of the pierce metal are each a plate in some example embodiments described above. However, in some embodiments, a member to be joined by means of the pierce metal does not necessarily have to be a plate.

According to at least one embodiment of the technology, even under circumstances in which the shaft, having been penetrated through the through-hole of the aluminum die-cast member, has thermally expanded upon the spot welding, the non-contact part that comes into non-contact with the through-hole of the aluminum die-cast member in a state in which the shaft is penetrated through the aluminum die-cast member remains in non-contact with the through-hole even upon the thermal expansion, or generates less pressing force even if the non-contact part comes into contact with the through-hole. Accordingly, it is possible to allow the stress to be applied to the aluminum die-cast member, such as the compressive stress, to be zero (0) or to be small as compared with a typical pierce metal including a shaft that has a constant outer diameter and is waistless, for example, and thereby to reduce or prevent the occurrence of the crack even for the aluminum die-cast member whose ductility is low.

In the pierce metal according to some embodiments of the technology, even under circumstances in which the shaft has thermally expanded upon the spot welding, the shaft having the hollow shape allows an amount of thermal expansion toward the outer side in the radial direction to be smaller than that of the solid shaft. Accordingly, it is possible to allow the stress to be applied to the aluminum die-cast member, such as the compressive stress, to be zero (0) or to be small and thereby to reduce or prevent the occurrence of the crack even for the aluminum die-cast member whose ductility is low. In addition, even in a case where a position with which the electrode comes into contact upon the spot welding is misaligned from the middle of the head, i.e., misaligned from the center of the shaft, a current that flows upon the spot welding flows in a concentrated fashion at the center of the shaft in the protruded tip surface of the shaft. This helps to ensure that the nugget is formed between the protruded tip of the shaft and the iron-based member, and that the shaft of the pierce metal and the iron-based member are spot welded consequently. Accordingly, this in turn helps to ensure that the aluminum die-cast member and the iron-based member are joined together.

In the pierce metal according to at least one embodiment of the technology, even in a case where a position with which the electrode comes into contact upon the spot welding is misaligned from the middle of the head, i.e., misaligned from the center of the shaft, a current that flows upon the spot welding flows in a concentrated fashion at the center of the shaft in the protruded tip surface of the shaft. This helps to ensure that the nugget is formed between the protruded tip of the shaft and the iron-based member, and that the shaft of the pierce metal and the iron-based member are spot welded consequently. Accordingly, this in turn helps to ensure that the aluminum die-cast member and the iron-based member are joined together.

In the method of joining different materials according to at least one embodiment of the technology, even under circumstances in which the shaft, having been penetrated through the aluminum die-cast member, has thermally expanded upon the spot welding, it is possible to allow the stress to be applied to the aluminum die-cast member, such as the compressive stress, to be zero (0) or to be small as compared with a typical pierce metal including a shaft that has a constant outer diameter and is waistless, for example. Accordingly, it is possible to reduce or prevent the occurrence of the crack even for the aluminum die-cast member whose ductility is low.

According to at least one embodiment of the technology, it is possible to ensure that the aluminum die-cast member and the iron-based member are joined together while reducing or preventing the occurrence of the crack of the aluminum die-cast member even upon joining, by means of the spot welding, different materials including the aluminum die-cast member, whose ductility is low, and the iron-based member. Hence, it is possible to improve quality of joining the different materials including the aluminum die-cast member and the iron-based member.

The invention claimed is:

1. A pierce metal for joining different materials including an aluminum die-cast member and an iron-based member, the pierce metal comprising:
   a head; and
   a shaft that is provided integrally with the head and protrudes from the head, the shaft including an outer peripheral surface and a protruded tip surface,
   wherein the shaft is configured to penetrate through the aluminum die-cast member with the protruded tip surface being exposed from the aluminum die-cast member, and the outer peripheral surface is configured to come into contact with a through-hole of the aluminum die-cast member, upon joining the aluminum die-cast member and the iron-based member together,
   wherein the head and the iron-based member which is in contact with the protruded tip surface are configured to be held under pressure by a pair of weld electrodes and are configured to be applied with electric power by the pair of weld electrodes to perform spot welding of the protruded tip surface and the iron-based member, upon joining the aluminum die-cast member and the iron-based member together, and
   wherein the outer peripheral surface includes:
   a first part configured to contact with the through-hole in a state in which the shaft is penetrated through the aluminum die-cast member;
   a second part located closer to the head than the first part and having substantially same diameter as the first part; and
   a non-contact part located between the first part and the second part, having a smaller diameter than the first part and configured to avoid contact with the through-hole in a state in which the shaft is penetrated through the aluminum die-cast member.

2. The pierce metal according to claim 1, further comprising a hollow part extending from the head to the shaft, excluding the protruded tip surface.

3. A pierce metal for joining different materials including an aluminum die-cast member and an iron-based member, the pierce metal comprising:
   a head;
   a shaft that is provided integrally with the head and protrudes from the head, the shaft including an outer peripheral surface and a protruded tip surface; and
   a hollow part extending from the head to penetrate into the shaft, excluding the protruded tip surface,
   wherein the shaft is configured to penetrate through the aluminum die-cast member with the protruded tip surface being exposed from the aluminum die-cast member, and the outer peripheral surface is configured to come into contact with a through-hole of the aluminum die-cast member, upon joining the aluminum die-cast member and the iron-based member together, and
   wherein the head and the iron-based member which is in contact with the protruded tip surface are configured to be held under pressure by a pair of weld electrodes and are configured to be applied with electric power by the pair of weld electrodes to perform spot welding of the protruded tip surface and the iron-based member, upon joining the aluminum die-cast member and the iron-based member together.

4. A method of joining different materials including an aluminum die-cast member and an iron-based member, the method comprising:
   preparing a pierce metal for joining the different materials, the pierce metal including a head and a shaft that is provided integrally with the head and protrudes from the head, the shaft including an outer peripheral surface and a protruded tip surface;

driving the pierce metal into the aluminum die-cast member to cause the shaft to penetrate through the aluminum die-cast member with the protruded tip surface being exposed from the aluminum die-cast member in such a manner that the outer peripheral surface comes into contact with a through-hole of the aluminum die-cast member, and the outer peripheral surface includes a non-contact part that avoids contact with the through-hole in a state in which the shaft is penetrated through the aluminum die-cast member; and spot welding the protruded tip surface and the iron-based member, through holding the head and the iron-based member which is in contact with the protruded tip surface under pressure by a pair of weld electrodes and applying electric power to the head and the iron-based member by the pair of weld electrodes, wherein the outer peripheral surface includes:
a first part configured to contact with the through-hole in a state in which the shaft is penetrated through the aluminum die-cast member; and
a second part located closer to the head than the first part and having substantially same diameter as the first part, and wherein the non-contact part is located between the first part and the second part and has a smaller diameter than the first part.

5. The method according to claim 4, wherein the pierce metal further includes a hollow part extending from the head to the shaft, excluding the protruded tip surface.

6. A method of joining different materials including an aluminum die-cast member and an iron-based member, the method comprising:

preparing a pierce metal for joining the different materials, the pierce metal including
a head;
a shaft that is provided integrally with the head and protrudes from the head, the shaft including an outer peripheral surface and a protruded tip surface; and
a hollow part extending from the head to penetrate into the shaft, excluding the protruded tip surface;

driving the pierce metal into the aluminum die-cast member to cause the shaft to penetrate through the aluminum die-cast member with the protruded tip surface being exposed from the aluminum die-cast member in such a manner that the outer peripheral surface comes into contact with a through-hole of the aluminum die-cast member; and spot welding the protruded tip surface and the iron-based member, through holding the head and the iron-based member which is in contact with the protruded tip surface under pressure by a pair of weld electrodes and applying electric power to the head and the iron-based member by the pair of weld electrodes.

7. The pierce metal according to claim 1, wherein the head includes a swaging part penetrating into the aluminum die-cast member such that a bottom surface of the swaging part is located below a top surface of the aluminum die-cast member located on opposing sides of the swaging part.

8. The pierce metal according to claim 1, wherein the pierce metal has a hollow shape including a recess extending from a middle of the head to a center of the shaft.

9. The pierce metal according to claim 8, wherein a distance between a top surface of the iron-based member to a bottom surface of the recess is less than a distance between the top surface of the iron-based member to the top surface of the aluminum die-cast member.

10. The pierce metal according to claim 7, wherein a distance between a top surface of the iron-based member to the bottom surface of the swaging part is less than a distance between the top surface of the iron-based member to the top surface of the aluminum die-cast member.

11. The pierce metal according to claim 1, wherein an entirety of the tip surface of the shaft has a dome shape that protrudes spherically.

12. The pierce metal according to claim 8, wherein a distance between the protruded tip surface of the shaft to a bottom surface of the recess is half or less than a length of the shaft.

13. The pierce metal according to claim 4, wherein the pierce metal has a hollow shape including a recess extending from a middle of the head to a center of the shaft.

14. The pierce metal according to claim 13, wherein a distance between the protruded tip surface of the shaft to a bottom surface of the recess is half or less than a length of the shaft.

15. The pierce metal according to claim 3, wherein the head includes a swaging part penetrating into the aluminum die-cast member such that a bottom surface of the swaging part is located below top surface of the aluminum die-cast member located on opposing sides of the swaging part.

16. The pierce metal according to claim 3, wherein a distance between a top surface of the iron-based member to a bottom surface of the hollow part is less than a distance between the top surface of the iron-based member to a top surface of the aluminum die-cast member.

17. The pierce metal according to claim 3, wherein a distance between a top surface of the iron-based member to a bottom surface of the hollow part is half or less than a length of the shaft.

18. The method according to claim 6, wherein the head includes a swaging part penetrating into the aluminum die-cast member such that a bottom surface of the swaging part is located below a top surface of the aluminum die-cast member located on opposing sides of the swaging part.

19. The method according to claim 6, wherein a distance between a top surface of the iron-based member to a bottom surface of the hollow part is less than a distance between the top surface of the iron-based member to a top surface of the aluminum die-cast member.

20. The method according to claim 6, wherein a distance between a top surface of the iron-based member to a bottom surface of the hollow part is half or less than a length of the shaft.

* * * * *